(12) United States Patent
Yancey et al.

(10) Patent No.: US 10,698,769 B2
(45) Date of Patent: *Jun. 30, 2020

(54) TECHNIQUES FOR IMPLEMENTING BATCH PROCESSING IN A DATABASE SYSTEM

(71) Applicant: salesforce.com, inc., San Francisco, CA (US)

(72) Inventors: Scott Yancey, San Francisco, CA (US); Andrew Smith, San Francisco, CA (US); Andrew Waite, Novato, CA (US); Craig Weissman, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 185 days.

This patent is subject to a terminal disclaimer.

(21) Appl. No.: 15/995,142

(22) Filed: Jun. 1, 2018

(65) Prior Publication Data

US 2019/0026188 A1    Jan. 24, 2019

Related U.S. Application Data

(63) Continuation of application No. 15/056,764, filed on Feb. 29, 2016, now Pat. No. 10,007,576, which is a continuation of application No. 13/916,457, filed on Jun. 12, 2013, now Pat. No. 9,275,098, which is a continuation of application No. 12/197,979, filed on Aug. 25, 2008, now Pat. No. 8,473,469.

(51) Int. Cl.
G06F 11/14     (2006.01)
G06F 16/23     (2019.01)
G06F 16/27     (2019.01)

(52) U.S. Cl.
CPC ...... *G06F 11/1451* (2013.01); *G06F 16/2365* (2019.01); *G06F 16/2372* (2019.01); *G06F 16/273* (2019.01)

(58) Field of Classification Search
CPC ............ G06F 11/1451; G06F 16/2372; G06F 16/2365; G06F 16/273
See application file for complete search history.

(56) References Cited

U.S. PATENT DOCUMENTS 5,072,370 A    12/1991   Durdik
5,577,188 A    11/1996   Zhu
5,608,872 A    3/1997    Schwartz et al.
(Continued)

OTHER PUBLICATIONS

[Online];[published on Apr. 22, 2008];[retrieved on Feb. 26, 2010]; retrieved from http://en.wikipedia.org/wiki/Flat-file-database.

(Continued)

*Primary Examiner* — Jorge A Casanova
(74) *Attorney, Agent, or Firm* — Elliot, Ostrander & Preston, P.C.

(57) ABSTRACT

In accordance with embodiments, there are provided techniques for implementing batch processing in a multi-tenant database system. These techniques for implementing batch processing in a multi-tenant database system may enable embodiments to provide great flexibility to a tenant of the architecture to perform desired functions on content of the database while allowing the owner of the architecture schedule the processing of the functions on the content.

18 Claims, 9 Drawing Sheets

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,950,190 A | 9/1999 | Yeager et al. |
| 5,963,953 A | 10/1999 | Cram et al. |
| 6,092,083 A | 7/2000 | Brodersen et al. |
| 6,112,198 A | 8/2000 | Lohman et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,438,562 B1 | 8/2002 | Gupta et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,721,765 B2 | 4/2004 | Ghosh et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,839,608 B2 | 1/2005 | Sarabi et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,947,927 B2 | 9/2005 | Chaudhuri et al. |
| 7,174,483 B2 | 2/2007 | Becher et al. |
| 7,177,866 B2 * | 2/2007 | Holenstein .......... G06F 11/2064 707/615 |
| 7,206,805 B1 | 4/2007 | McLaughlin, Jr. |
| 7,206,807 B2 | 4/2007 | Cheenath |
| 7,209,929 B2 | 4/2007 | Dominguez et al. |
| 7,249,118 B2 | 7/2007 | Sandler et al. |
| 7,305,577 B2 | 12/2007 | Zhang |
| 7,340,411 B2 | 3/2008 | Cook |
| 7,350,237 B2 | 3/2008 | Vogel et al. |
| 7,373,364 B1 | 5/2008 | Chapman |
| 7,448,079 B2 | 11/2008 | Tremain |
| 7,484,219 B2 | 1/2009 | Mitra |
| 7,529,728 B2 | 5/2009 | Weissman et al. |
| 7,580,975 B2 | 8/2009 | Cheenath |
| 7,599,953 B2 | 10/2009 | Galindo-Legaria et al. |
| 7,620,655 B2 | 11/2009 | Larsson et al. |
| 7,661,027 B2 | 2/2010 | Langen et al. |
| 7,693,820 B2 | 4/2010 | Larson et al. |
| 7,734,608 B2 | 6/2010 | Fell et al. |
| 7,769,825 B2 | 8/2010 | Karakashian et al. |
| 7,774,366 B2 | 8/2010 | Fisher et al. |
| 7,779,039 B2 | 8/2010 | Weissman et al. |
| 7,814,052 B2 | 10/2010 | Bezar et al. |
| 7,814,470 B2 | 10/2010 | Mamou et al. |
| 7,827,138 B2 | 11/2010 | Salmon et al. |
| 8,244,759 B2 | 8/2012 | Brooks et al. |
| 8,296,321 B2 | 10/2012 | Durdik et al. |
| 8,443,366 B1 | 5/2013 | Yancey |
| 8,473,518 B1 | 6/2013 | Yancey et al. |
| 8,776,067 B1 | 7/2014 | Yancey |
| 9,361,366 B1 | 6/2016 | Yancey et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2004/0111410 A1 | 6/2004 | Burgoon et al. |
| 2005/0262188 A1 | 11/2005 | Mamou et al. |
| 2011/0078213 A1 | 3/2011 | Bezar et al. |

OTHER PUBLICATIONS

[Online];[published on Apr. 25, 2008];[retrieved on Feb. 26, 2010]; retrieved from http://en.wikipedia.org/wiki/Relational-database.

[Online];[published on Oct. 17, 2008];[retrieved on Feb. 26, 2010]; retrieved from http://en.wikipedia.org/wiki/Push-technology.

Final Office Action for U.S. Appl. No. 12/197,979, dated Apr. 21, 2011, 14 pages.

International Search Report and Written Opinion for International Patent Application No. PCT/US2010/050021, dated Dec. 28, 2018, 10 pages.

Lee, et al., "Composition of executable business process models by combining business rules and process flows," Expert Systems With Application, Oxford, GB, vol. 33, No. 1, Dec. 22, 2006, pp. 221-229.

Mietzer, et al., "Combining Different Multi-tenancy Patterns in Service Oriented Applications," IEE International Enterprise Distributed Object Computing Conference, NJ, USA, Sep. 1, 2009, pp. 131-140.

Non-Final Office Action for U.S. Appl. No. 12/197,979, dated Dec. 6, 2010, 13 pages.

Notice of Allowance for U.S. Appl. No. 12/197,979, dated Apr. 24, 2013, 9 pages.

Salesforce, AJAX Toolkit Developer's Guide, https://resources.docs.salesforce.com/sfdc/pdf/apex_ajax.pdf?major=146, salesforce.com, Apr. 2007, pp. 1-40.

Salesforce, Apex Web Services API Developer's Guide, https://resources.docs.salesforce.com/sfdc/pdf/apex_api.pdf?major=146, salesforce.com, Apr. 2007, pp. 1-423.

Wang, et al., "Integrated Constraint Violation Handling for Dynamic Services Composition," IEE International Conference on Services Computing, NJ, USA, Sep. 21, 2009, pp. 168-175.

Wang, et al.,"A Study and Performance Evaluation of the Multi-Tenant Data Tier Design Patterns for Service Oriented Computing," IEE International Conference on E-Business Engineering, NJ, USA, Oct. 22, 2008, pp. 94-101.

(56) References Cited

OTHER PUBLICATIONS

Wermelinger, et al., "Using coordination contracts for flexible adaptation to changing business rules," Proceedings of the Sixth International Workshop on Software Evolution, NJ, USA, Sep. 1, 2003, pp. 115-120.

* cited by examiner

TECHNIQUES FOR IMPLEMENTING BATCH PROCESSING IN A DATABASE SYSTEM

CLAIM OF PRIORITY

This continuation application is related to, and claims priority to, the utility patent application entitled "TECHNIQUES FOR IMPLEMENTING BATCH PROCESSING IN A DATABASE SYSTEM," filed Feb. 29, 2016, having application number of Ser. No. 15/056,764; and this continuation application is related to, and claims priority to, the utility patent application entitled "TECHNIQUES FOR IMPLEMENTING BATCH PROCESSING IN A DATABASE SYSTEM," filed Jun. 12, 2013, having application number of Ser. No. 13/916,457; and this continuation application is related to, and claims priority to, the utility patent application entitled "TECHNIQUES FOR IMPLEMENTING BATCH PROCESSING IN A MULTI-TENANT ON-DEMAND DATABASE SYSTEM," filed Aug. 25, 2008, having application Ser. No. 12/197,979, the entire contents of all of which are incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The current invention relates generally to databases. More particularly the current invention relates to techniques for implementing batch processes on multi-tenant databases.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The efficient retrieval of accurate information and subsequent delivery of this information to the user system has been and continues to be a goal of administrators of database systems.

Unfortunately, conventional database approaches might become inefficient if, for example, updating applications in the presence of complex data structures. A database system may also process a query relatively slowly if, for example, a relatively large number of users substantially concurrently access the database system.

Accordingly, it is desirable to provide techniques enabling an owner of the database system to improve the ease of use of the database system.

BRIEF SUMMARY

In accordance with embodiments, there are provided techniques for implementing batch processing in a multi-tenant on-demand database system. These techniques for implementing batch processing in a multi-tenant on-demand database system can enable embodiments to ease the burden of manipulating data when updating the database. It may also reduce the computational load on the database by holding execution of batch processes until a desired time.

In an embodiment and by way of example, a method implementing batch processing in a multi-tenant on-demand database system includes operating on instructions from a tenant to have the database system perform processes on a subset of content stored on the database system. Identified among the instructions is an object associated with a class to execute a batch code interface that invokes multiple methods to schedule and execute functions upon the subset. The batch code interface is executed asynchronously with operations of the database system by invoking the multiple methods, thereby providing a batch processing facility to the tenant.

The present invention is described with reference to an embodiment in which an apparatus implements a batch process in a multi-tenant on demand architecture. Although the invention is discussed with respect to supporting multiple tenants; the present invention is not limited to multi-tenant database systems. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF SUMMARY OF THE DRAWINGS

In the following drawings like reference numbers are used to refer to like elements. Although the following figures depict various examples of the invention, the invention is not limited to the examples depicted in the figures.

DETAILED DESCRIPTION

Systems and methods are provided to implement batch processing in a multi-tenant on-demand database system. As used herein, the term multi-tenant database system (MTS) refers to those systems in which various elements of hardware and software of the database system may be shared by one or more users. For example, a given application server may simultaneously process requests for a great number of customers, and a given database table may store rows for a potentially much greater number of customers.

Figure 1:
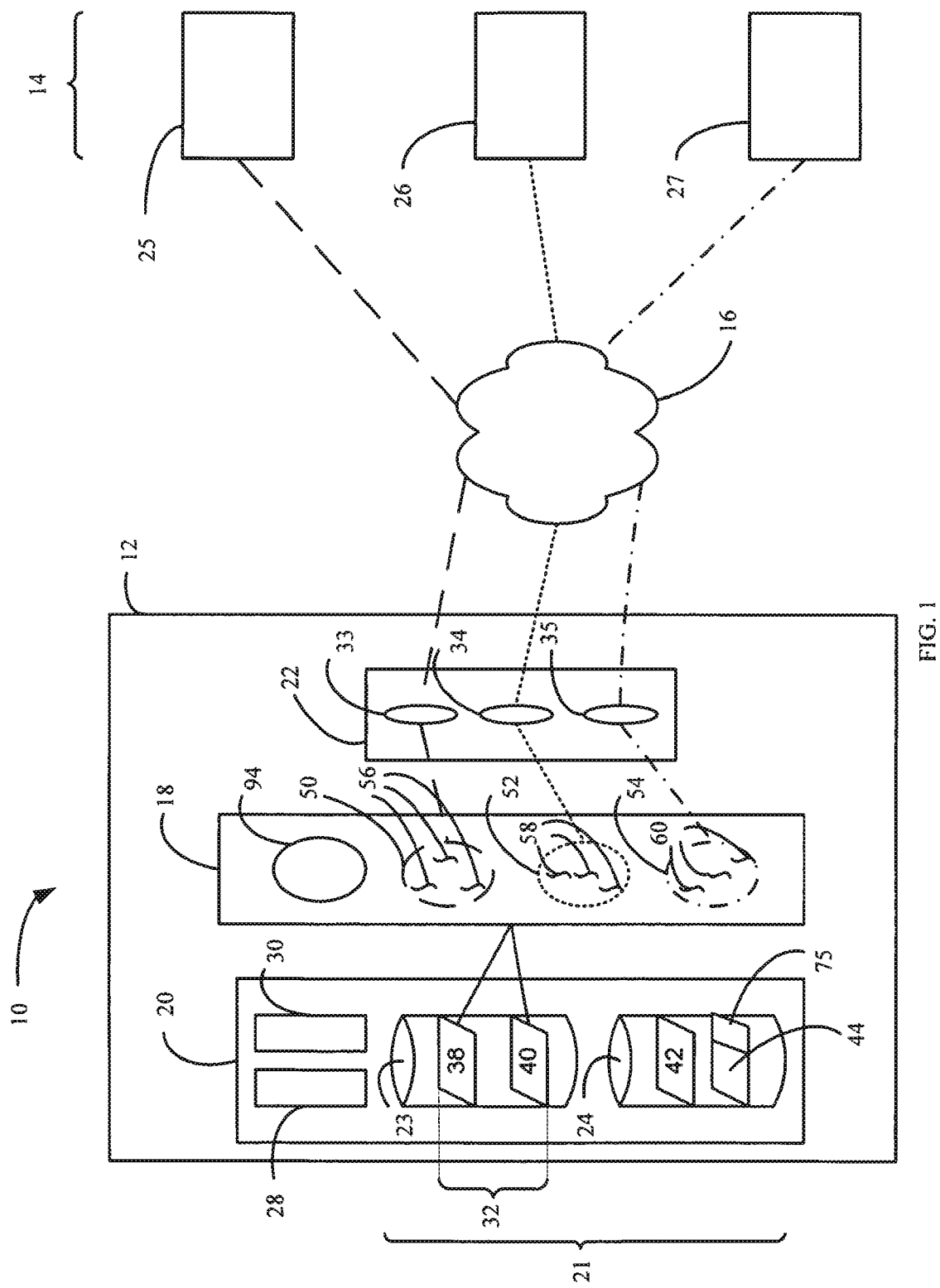
FIG. 1 illustrates a representative architecture for batch processing in a multi-tenant database system in accordance with one embodiment of the present invention.

FIG. 1 illustrates a database architecture 10 that includes server side facilities 12 and client side facilities 14 in data communication over a network 16. Server side facilities 12 includes processor sub-system 18, memory space 20, in data communication therewith, and network interface resources 22 in data communication with both memory space 20 and processor sub-system 18. Processor sub-system 18 may be any known processor sub-system in the art, e.g., the CORE DUO® or the CORE 2 DUO® from Intel Corporation of Santa Clara, Calif. Memory space 20 includes drive storage 21, shown as one or more hard drives 23 and 24, as well as data and instruction registers, shown as 28, and volatile and non-volatile memory shown as 30. Data communication network 16 may be any network or combination of networks of devices that communicate with one another. Network 16 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

Server side facilities 12 access to a database 32 by multiple users 25-27 of client side facilities 14 over data communication network 16. To that end, network interface resources 22 include a plurality of virtual portals 33-35. Each virtual portal 33-35 provides an "instance" of a portal user interface coupled to allow access to database 32.

Typically, tenants obtain rights to store information, referred to as tenant information 38 and 40, on database 32 and make the same accessible to one or more users 25-27 to whom the tenant provides authorization. This is typically achieved by rental agreements between the tenant and an owner/provider of architecture 10. In this manner, architecture 10 provides an on-demand database service to users 25-27 that are not necessarily concerned with building and/or maintaining the database system; rather, these functions are addressed between the tenant and the owner/provider.

With architecture 10, multiple users 25-27 may access database 32 through a common network address, in this example a universal resource locator (URL). In response, webpages and other content may be provided to users 25-27 over network 16. The resources of database 32 that users 25-27 may access can be different, depending on user's 25-27 security or permission level and/or tenant association. As a result, data structures included in tenant information is managed so as to be allocated at the tenant level, while other data structures might be managed at the user level. Because architecture 10 supports multiple tenants including possible competitors, security protocols 42 and other system software 44, stored for example on hard drive 26, maintain applications and applications' use to only those users 25-27 with proper access rights. Also, because many tenants may desire access to architecture 10 rather than maintain their own system, redundancy, up-time, and backup are additional functions that may be implemented in architecture 10. In addition to user-specific data and tenant specific data, server side facilities 12 might also maintain system level data usable by multiple tenants or other data. Such system level data might include industry reports, news, postings, and the like that are sharable among tenants.

For example, in certain embodiments architectures 10 may allow users 25-27 associated with the tenant, referred to as tenant users, access to a sub-portion of the content of the database information that the tenant may be allowed to access. The sub-portion that any one of users 25-27 may access may be the same as, or different from, the sub-portion that the remaining users 25-27 may access. Users 25-27 not associated with a tenant would not be allowed access to information 38 and 40. For example, assume users 25 and 26 are associated with the tenant corresponding to tenant information 38 and not associated with the tenant corresponding to tenant information 40. Users 25 and 26 would not be allowed access to tenant information 40 and would be allowed access to tenant information 38 or a sub-portion thereof. In the present example, user 25 may be allowed access to a first portion of tenant information 38 and user 26 may be allowed access to a second portion of tenant information 38, which is mutually exclusive. Similarly, were user 27 associated with the tenant corresponding to tenant information 40 and not the tenant corresponding to tenant information 38, user 27 would be allowed to access tenant information 40, or a portion thereof, and not tenant information 38. It is possible, however, that one of users 25-27 are associated to the tenants corresponding to both sets of tenant information 38 and 40.

Virtual portals 33, 34 and 35 facilitate providing resources of database 32 on behalf of a tenant to users 25-27 associated with the tenant. Each user 25-27 logs into one of virtual portals 33, 34 and 35 to access resources of database 32 through a unique uniform resource locator (URL) or other type of address. Based on the URL and other identifying information associated with users 25-27, architecture 10 may determine the resources of database 32 users 25-27 may access. For example, user 25 communicates with database through virtual portal 33, user 26 communicates with database 32 through virtual portal 34, and user 27 communicates with database through virtual portal 35. It is possible, however, that all users 25-27 may use a common portal, as well. To that end, users 25-27 desiring to access resources of database 32 employ virtual portals 33, 34 and 35 to validate against the information stored on architecture 10, corresponding to the user 25-27 requesting access to a subportion of content on database 32.

The result of the communications between users 25-27 and server side facilities 12 results in multiple processes 50, 52 and 54 being executed by processor sub-system 18. Thus, it is desired that processor sub-system 18 be capable of providing uninterrupted interaction with users 25-27 to provide online transaction processing (OLTP) to each of users 25-27. As a result, each of processes 50, 52 and 54 may include one or more threads of execution. This is shown as threads 56 associated with process 50, threads 58 associated with process 52 and threads 60 associated with process 54.

Figure 2:
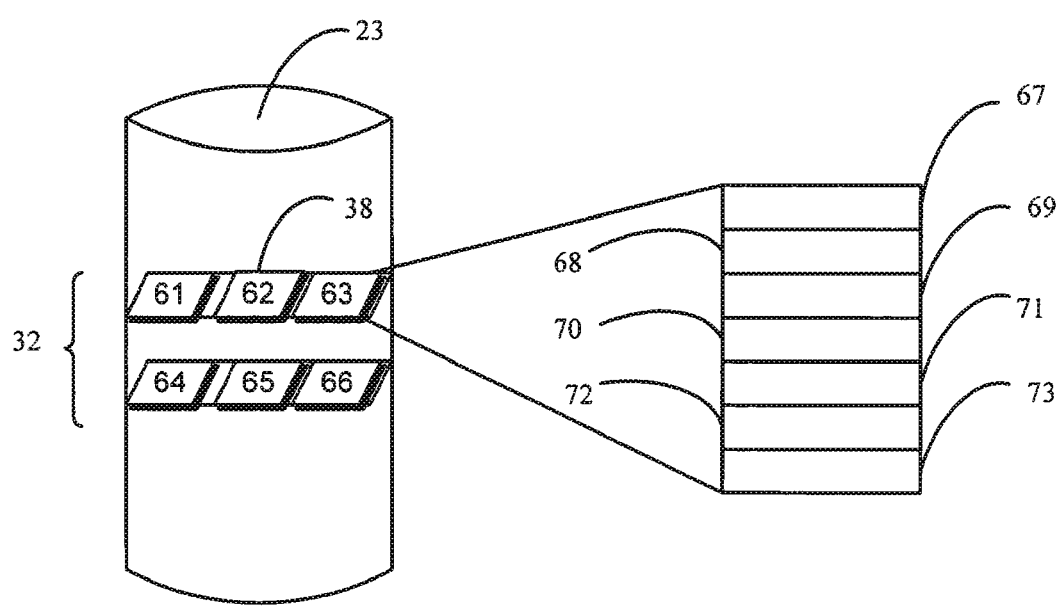
FIG. 2 is a simplified schematic view showing relationships between tenant information and objects stored on a database shown in FIG. 1 in accordance with the present invention.

Referring to both FIGS. 1 and 2, it is desired that tenants and/or users 25-27 associated therewith have the ability to easily and reliably manipulate large volumes of data while avoiding consuming excessive resources of processor subsystem J 8. The challenge presented by these seemingly contravening requirements is realized by realizing the nature of the use of architecture 10 by tenants. An example of a tenant may be a company that employs a sales force where each salesperson uses server side facilities 12 to manage their sales process, such as by a management representative of the tenant, e.g., Vice President of Sales, the Chief Executive Officer of the tenant and the like. In this fashion, architecture facilitates Customer Relations Management (CRM). Thus, one or more of users 25-27 may be a salesperson that maintains information applicable to that salesperson's sales process and may be different from information related to other salespersons' sales process. Although the sales force accessing database 32 is represented by three users 25-27, in practice hundreds of salespersons would access database 32. Moreover, sales process data of each sales person may include thousands of files. An example of sales process data may include, without limitation, contact data, leads data, customer follow-up data, performance data, goals and progress data applicable to that salesperson's personal sales process.

Moreover, to facilitate management of this information, the tenant associated with the salespersons may restrict each of the salespersons to access specific sales process information. However, a tenant, or representative thereof based upon a contractual relationship between the salesperson and the representative, may be able to view all sale process information for the salespersons associated with the tenant. An example of a contractual relationship is a managerial/supervisory relationship. The managerial relationship between the salesperson and the tenant representative may provide the representative with a higher permission level when compared to the permission level of the salesperson, because, inter alia, the tenant representative may be a manager/supervisor of the salesperson. Another contractual relationship may be the principle agent relationship wherein the tenant representative has no day-to-day management responsibility of the salesperson. Nonetheless, as the representative of the principle, e.g., the tenant, the representative may view all of the salesperson information, because the salespersons may be deemed to be merely agents of the tenant.

Tenant information 38 and 40 may be viewed as a collection of objects, such as a set 61-66 of logical tables, containing data fitted into predefined categories. This is shown as data objects 67-73 with respect to tenant set 63. A "table" is one representation of a data object, and may be used herein to simplify the conceptual description of objects and custom objects according to the present invention. It should be understood that "table" and "object" may be used interchangeably herein. Thus, it is realized that large amounts of objects having complex interrelationships may be subject to a request for manipulation, for example, a managerial relationship between a salesperson or thousands of salespersons, may change. To implement this change may require a substantial percentage of the computational resources of the processor sub-system 18. Thus, manipulating such a large quantity of data objects 67-73 may interfere with the computing experience of users 25-27 taking advantage of OLTP processes 50, 52, and 54.

Figure 3:
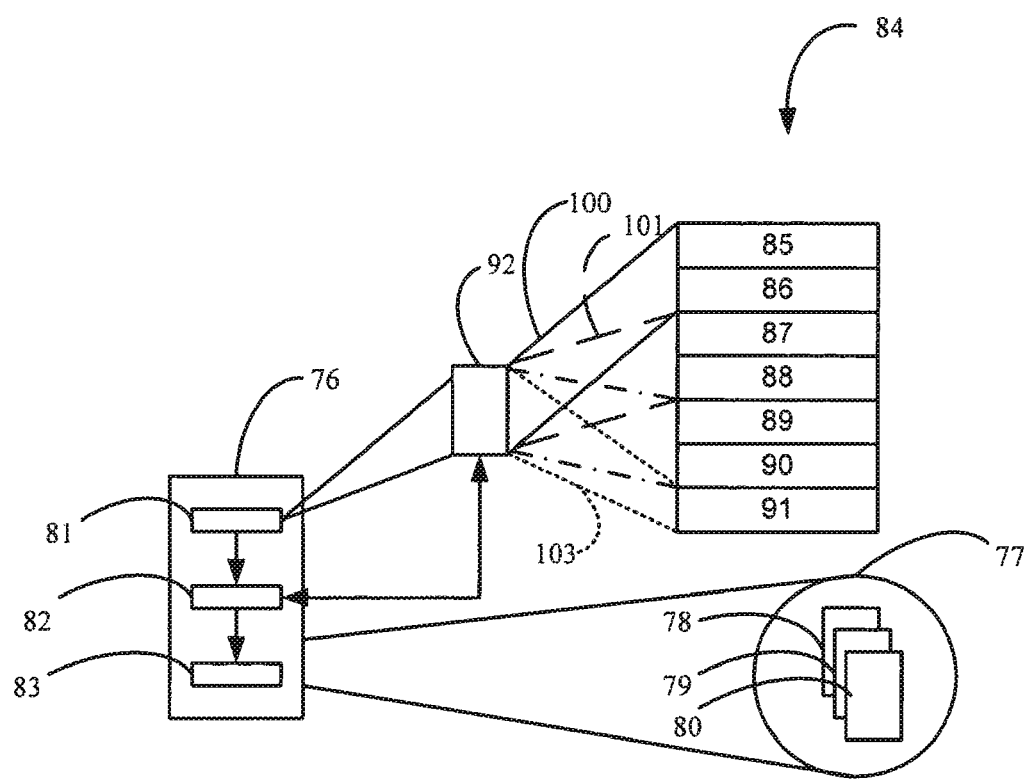
FIG. 3 is a plan view showing the relation between methods of a batch code interface and objects in a database shown in FIG. 1.
Figure 4:
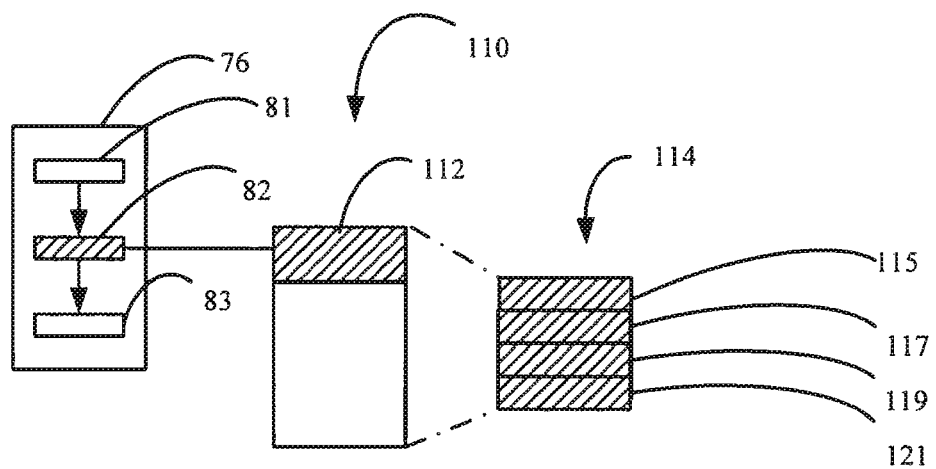
FIG. 4 is a simplified plan view showing a single batch code interface and the sequence in which a method associated therewith is called for different sub-groups of objects.
Figure 5:
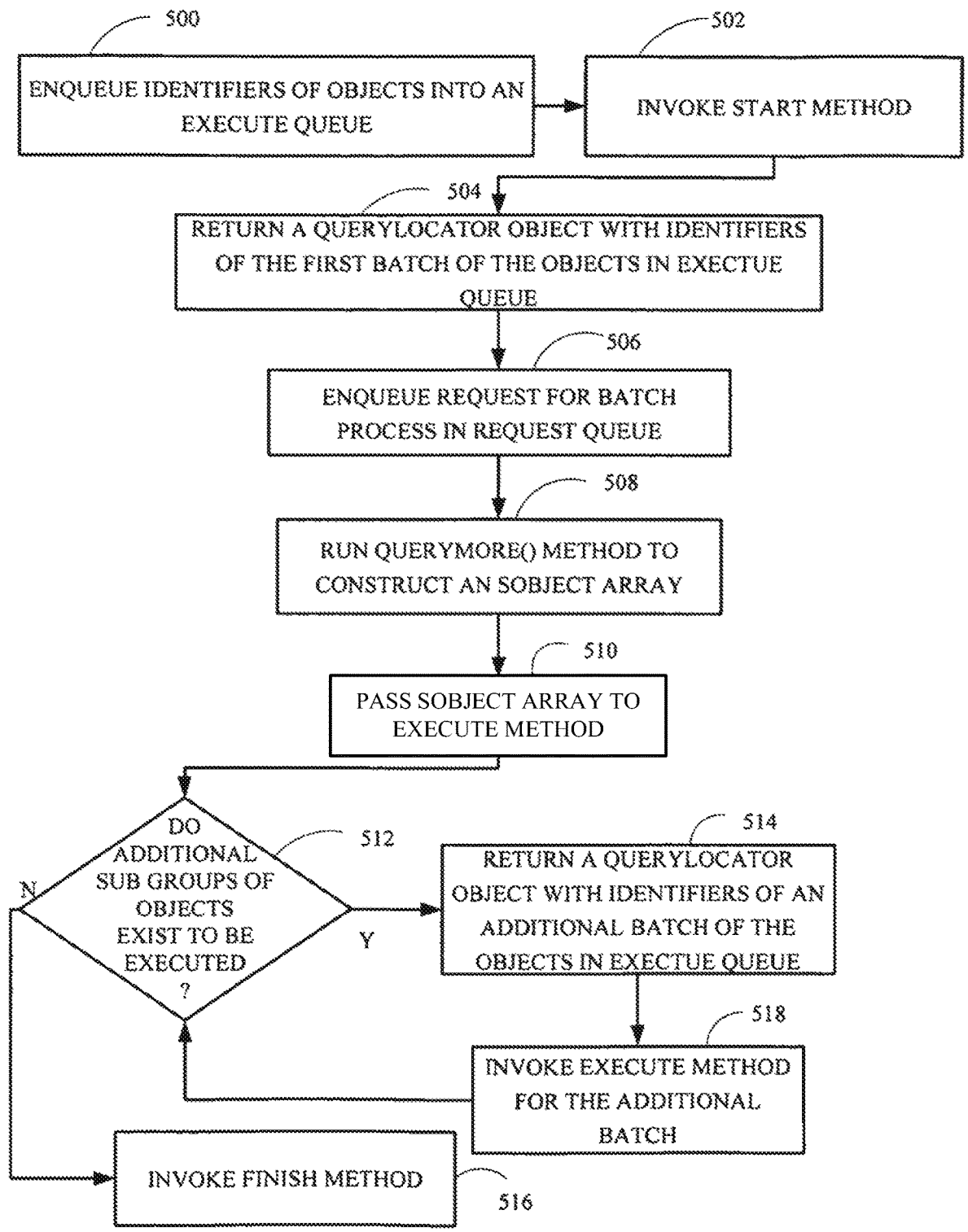
FIG. 5 is an operational flow diagram illustrating a high level overview of a method for batch processing in a multi-tenant database system in accordance with one embodiment.

Referring to both FIGS. 1 and 3, one embodiment of the current invention facilitates manipulation of large quantities of data objects in response to receiving request from a tenant and/or users 25-27 while reducing the risk of interference, or perceived interference, with OLTP processes 50, 52 and 54. This is achieved by providing system software 44 with a batch engine 75 that carries-out requests for manipulation of a large number of objects 67-73 asynchronously with respect to OLTP processes 50, 52 and 54. Batch engine 75 facilitates scheduling execution of functions on large quantities of data at the request of a tenant and/or user 25-27, referred to as a batch request. To that end, batch engine 75 includes a batch code interface 76 that is implemented when a class 77 of one or more special objects, shown as 78-80, is included in instructions from a tenant and/or a user 25-27. The instructions are typically included in tenant information 38 and 40 or may be received, in situ, during one of OLTP processes 50, 52 and 54. Batchable code interface 76 invokes multiple methods 81-83 that function to schedule and execute batch requests. Pseudo code for an example of batchable code interface 76 written using the Apex language available from Salesforce.com, inc. of San Francisco, Calif. is as follows:

```
/**
 * Returns a QueryLocator object, which is a handle to the
    full result set
 * to be processed.
 */
Database. Query Locator start(Database.BatchableInput
    stateVar);
/**
 * Each iteration over the Query Locator object returned in
    the start( ) method
 * will produce a batch of SObject records to process. This
    method will be
 * called for every batch, and will perform whatever work
    is defined by the
 * Apex developer.
 */
void executeBatch(Database.BatchableInput state Var,
    SObject[ ] scope);
/**
 * After completing all invocations of executeBatch, which
    means all data
 * identified in the startO method has been processed, this
    method will be
 * called and allows a developer to implement their own
    cleanup, notify,
 * etc. behavior.
 */
void finish(Database.BatchableInput state Var).
```

First method 81 is the Database.QueryLocator start (START) method that identifies the full set 84 of objects 85-91 that is the subject of the batch request. Second method 82 is the void executeBatch (EXECUTE) method that executes the manipulation defined by a tenant and or user 25-27. Third method 83 is the void finish (FINISH) method that is invoked after START method 81 and EXECUTE method 82 have completed. The result that occur in response to invocation of FINISH method 83 is defined by tenants and/or users 25-27 and may include sending notifications to users 25-27 that the batch process is complete and/or further details concerning the changes to tenant information 38 and 40 as a result of the batch process.

To ensure that a single batch process does not consume too great a quantity of resources of processor sub-subsystem 18, START method 81 calls a QueryLocator object 92 that points to a maximum number of objects that may be scheduled for uninterrupted processing. Specifically, the QueryLocator object 92 represents a server side database cursor persisted on architecture 10. As a result, Query Locator object 92 will retrieve a predetermined maximum number of objects 85-91 from set 84. As shown QueryLocator object 92 retrieves four different sub-groups 100, 101, 102 and 103, of objects 85-91. Sub-group 100 includes objects 85 and 86; sub-group 101 includes objects 87 and 88; sub-group 102 includes objects 89 and 90; and sub-group 103 includes object 91. As a result, EXECUTE method 82 is invoked four times by process 94, each time operating on a different one of sub-groups 100-103. In operation, the total number of objects in a result set that is identified by START method 81 may be in the millions. Therefore, the predetermined number retried by Query Locator object 92 is a quantity defined by the owner of architecture 10 and is dependent upon several technological and business factors, such as the processing capacity of architecture 10 and/or the business arrangements with tenants and/or a priori information concerning the consumption history of the resources of architecture 10. For example, an instance of batch engine 44 is a process 94 executing in processor sub-system 18, which, inter alia, which monitors the operation of architecture 10 to determine an appropriate time for invoking methods 81-83. This may be determined by dynamically monitoring other processes executing in processor sub-system 18, such as OLTP process 50, 52 and 54 and/or on a particular time during which consumption of architecture has historically been reduced, e.g., on Christmas day, Sundays and the like. Additionally, process 94 monitors the number of batch requests that architecture has scheduled for different tenants and determines the sequence in which to execute the EXECUTE method 82.

Referring to FIGS. 1, 3, 4 and 5, in operation, upon determining that a batch request is present, process 94 enqueues, at step 500, the batch request in a queue, referred to as a request queue 110, associated with memory space 20, i.e., in registers 28. As shown, request 112 corresponds to batch code interface 76. To facilitate invocation of EXECUTE method 82, process 94 enqueues an identifier of one of sub-groups 100-103 of objects 85-91 that will be the subject of EXECUTE method 82 in a second queue, referred to as execute queue 114, associated with memory space 20, i.e., in registers 28. Specifically, upon dequeue of request 112, process 94 instantiates the object associated therewith, for example one of objects 78-80 and invokes START method 81 at step 502. START method 81 returns, at step 504, QueryLocator object 92 that contains the identifier to the first batch of the result set of objects, for example sub-group 100 containing objects 85 and 86. As a result, process 94 enqueues execute queue 114 with the identifiers of sub-group 100 for example as identifier 115 at step 506. Upon dequeue of identifier 115, a queryMore( ) method is run by process 94 that returns an SObject array, which is an array representation of an instance of an entity or a row in 32. SObject array contains the objects that are to be the subject of EXECUTE method 82 at step 508. At step 510, process 94 then passes the SObject array to execute method 82 to perform the manipulation defined by method 82. At step 512 query More method determines whether additional objects 85-91 of set 84 remain to be subjected to EXECUTE method 82. If so, then process 94 enqueues execute queue 114 with the identifiers 117 for the next sub-group 101 of objects 87 and 88, at step 514. Following step 514, EXECUTE method 82 is invoked for the additional objects 85-91 of set 84; thereafter, step 512 occurs. Steps 514 and 512 repeat for the remaining sub-groups 102 and 103 having identifiers 119 and 121, respectfully. Finish method 83 is invoked at step 516 once it is determined at step 512 that there are no additional sub-groups of object that are to be subjected to EXECUTE method 82. It should be noted that process 94 will enqueue only a single sub-group in execute queue 114 for a given request 112. In this manner, when multiple batch code interfaces are queued in request queue 110 no one batch code interface prevented from having methods associated therewith invoked for an unreasonable length of time/process cycles.

Figure 6:
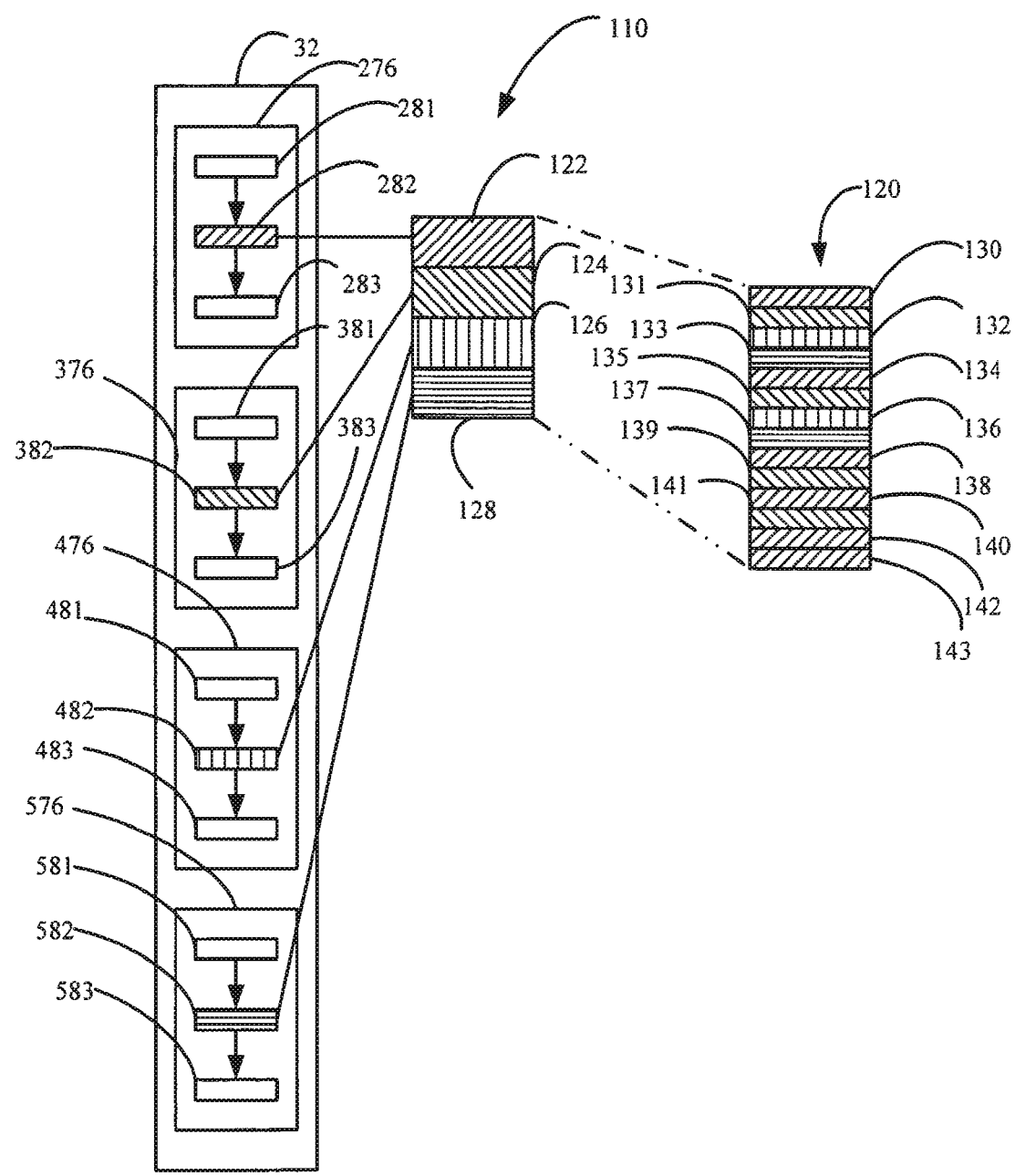
FIG. 6 is simplified plan view showing multiple batch code interfaces and the sequence in which requests to invoke methods associated with the multiple batch code interfaces occurs in accordance with an embodiment of the present invention.

Referring to FIGS. 1 and 6, database 32 is shown having four different batch code interfaces 276, 376, 476 and 576. For purposes of the present example batch code interfaces 276 and 376 correspond to a common tenant and batch code interfaces 476 and 576 correspond to two different tenants, which are also different from the tenant corresponding to batch code interfaces 276 and 376. Batch code interface 276 has a START method 281, an EXECUTE method 282 and a FINISH method 283; batch code interface 376 has a START method 381, an EXECUTE method 382 and a FINISH method 383; batch code interface 476 has a START method 481, an EXECUTE method 482 and a FINISH method 483; and batch code interface 576 has a START method 581, an EXECUTE method 582 and a FINISH method 583. To schedule each of batch code interface 276, 376, 476 and 576 for execution, process 94 places the requests in request queue 110. As shown, request 122 corresponds to batch code interface 276, request 124 corresponds to batch code interface 376, request 126 corresponds to batch code interface 476 and request 128 corresponds to batch code interface 576. To facilitate invocation of the EXECUTE methods 282, 382, 482 and 582, process 94 enqueues an identifier of one of several sub-groups (not shown) of objects (not shown) that will be the subject of one of EXECUTE methods 282, 382, 482 and 582 in EXECUTE queue 120. As shown, EXECUTE queue 120 includes identifiers 130-143. Identifiers 130, 134, 138, 140, 142 and 143 identify objects that are the subject of EXECUTE method 282. Identifiers 131, 135, 139 and 141 identify objects that are the subject of EXECUTE method 382. Identifiers 123 and 127 identify objects that are the subject of EXECUTE method 482. Identifiers 133 and 137 identify objects that are the subject of EXECUTE method 582.

With request 122 being first in request queue 110, start method 281 occurs before any of the remaining methods 282-283, 381-383, 481-483 and 581-583. However, this does not mean that request 122 will be completed before any of the remaining requests, 124, 126 and 128. Rather, as shown, multiple invocations of each of EXECUTE methods 282, 382, 482 and 582 occur in response requests 122, 124, 126 and 128, respectively. The invocation of any one of EXECUTE methods 282, 382, 482 and 582 is interleaved with the remaining EXECUTE methods 282, 382, 482 and 582. This results in at least one of EXECUTE methods 282, 382, 482 and 582 being invoked before completion of at least one request 122, 124, 126 and 128, in the present example. In this manner, no one request 122, 124, 126 and 128 prevents any of the remaining requests 122, 124, 126 and 128 to be subjected to an unreasonable amount of latency before execution of the methods associated therewith occurs. As shown, method 282 is invoked to operate upon a first sub-group of objects associated with identifier 130. However, before method 282 operates on a second sub-group of objects associated with identifier 134, method 382 is invoked to operate on a sub-group of objects associated with identifier 131, method 482 is invoked to operate on a sub-group of objects associated with identifier 132 and method 582 is invoked to operate on a sub-group of objects associated with identifier 133. Thus, process 94 interleaves invocation of the various methods 282, 382, 482 and 582 associated with requests 122, 124, 126 and 128, respectively.

Figure 7:
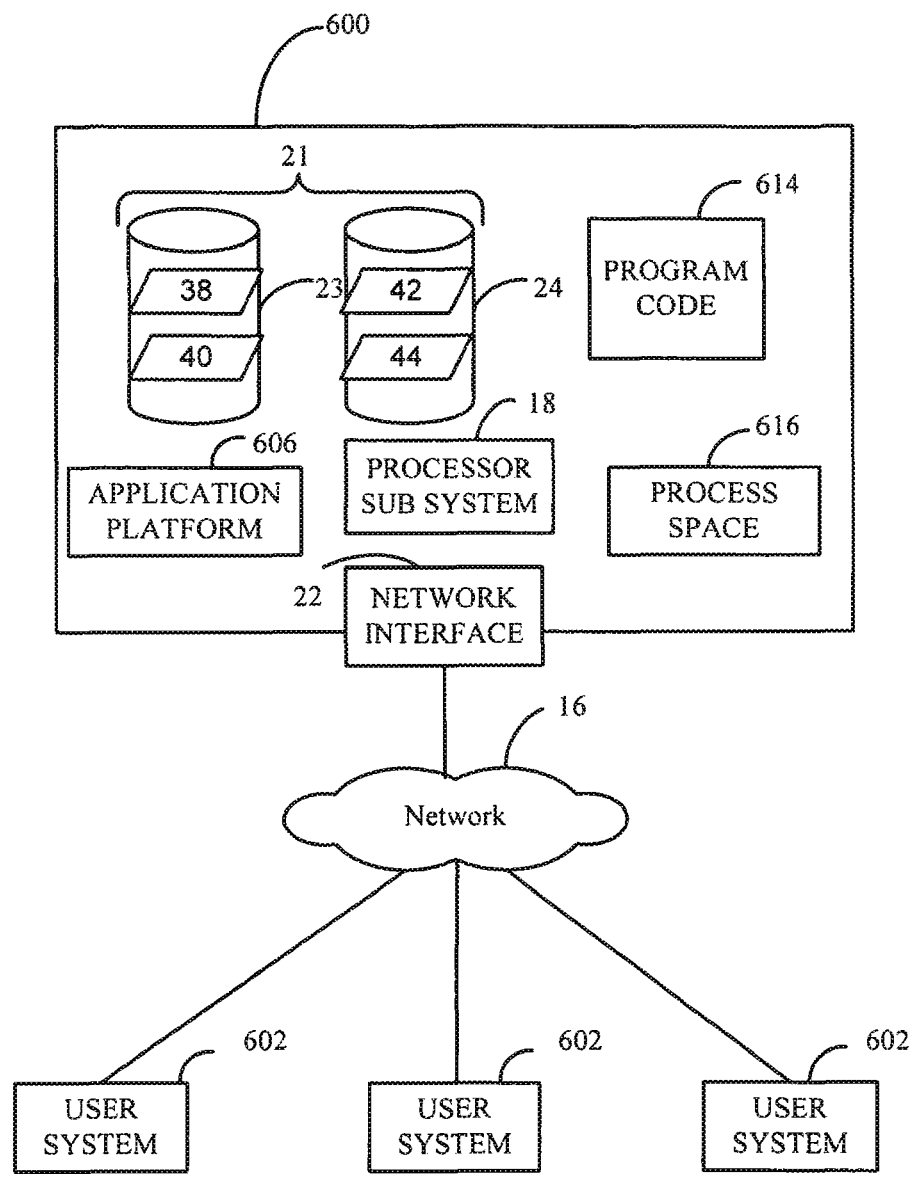
FIG. 7 illustrates a block diagram of an example of a representative system in which the architecture, shown in FIG. 1. may be practiced.

Referring to both FIGS. 1 and 7 a block diagram of a server system 600 employed to implement architecture 10 is shown as including multiple user systems 602 included in client side facilities 14 and in data communication with server system 600 over network 16. Server system 600 includes a processor sub-system 18, application platform 606, network interface 22, and drive storage 31 that includes database 32. In addition server system 600 includes program code 614, and process space 616. Program code 614 may include, among other code, code to facilitate a tenant to control the look-and-feel of the experience users 25-27 have when accessing database 32. Process space 616 facilitates execution of MTS system processes and tenant-specific processes, such as running applications as part of an application hosting service. Additional processes that may execute on server system 600 include database indexing processes. In other embodiments, server system 600 may not have all of the components listed and/or may have other elements instead of, or in addition to, those listed above. Server system 600, and additional instances of an MTS, where more than one is present, and all components thereof may be operator configurable using applications including computer code to run using a central processing unit such as processor sub-system 18.

Application platform 606 may be a framework that allows the applications of architecture 10 to run, such as the hardware and/or software, e.g., the operating system. In an embodiment, application platform 606 may enable creation, managing and executing one or more applications developed by the owner/provider of architecture 10, users 25-27 accessing architecture 10 via user systems 602, or third party application developers accessing architecture 10 via user systems 602.

In one embodiment, server system 600 implements a web-based customer relationship management (CRM) system. For example, in one embodiment, server system 600 includes application servers configured to implement and execute CRM software applications as well as provide related data, code, forms, webpages and other information to and from user systems 602 and to store to, and retrieve from, database system related data, objects, and Webpage content. Architecture 10 typically stores data for multiple tenants in the same physical database object, however, tenant data typically is arranged so that data of one tenant is kept logically separate from that of other tenants so that one tenant does not have access to another tenant's data, unless such data is expressly shared. In certain embodiments, server system 600 implements applications other than, or in addition to, the CRM application discussed above. For example, server system 600 may provide tenant access to multiple hosted (standard and custom) applications, including a CRM application. User (or third party developer) applications, which may or may not include CRM, may be supported by the application platform 606, which manages creation, storage of the applications into one or more database objects and executing of the applications in a virtual machine in the process space of server system 600.

Figure 8:
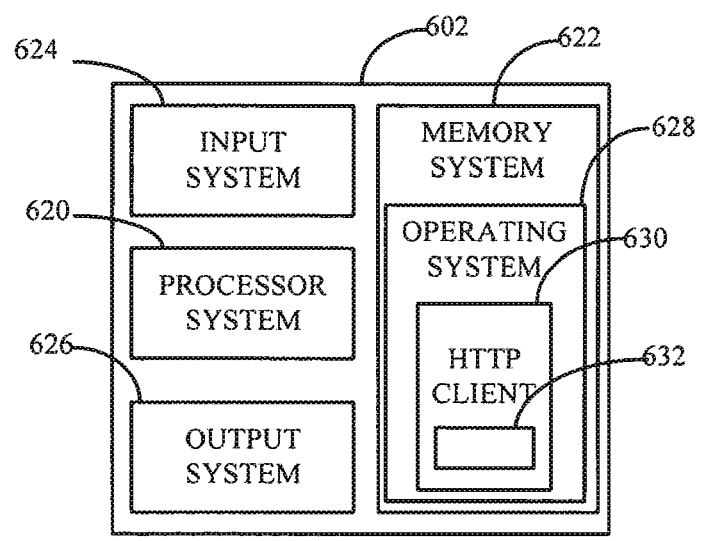
FIG. 8 is a detailed block diagram of a user system, shown in FIG. 7.

Referring to FIGS. 1, 7 and 8, to facilitate web-based CRM, user systems 602 might communicate with server system 600 using TCP/IP and, at a higher network level, use other common Internet protocols to communicate, such as HTTP, FTP, AFS, WAP, etc. To that end, user systems 602 may be any computing device capable of interfacing directly or indirectly to the Internet or other network connection, such as desktop personal computer, workstation, laptop, PDA, cell phone, or any wireless access protocol (WAP) enabled device and the like running an HTTP client 49. An example of a user system 602 includes a processor system 620, a memory system 622, an input system 624, and output system 626. Processor system 620 may be any combination of one or more processors. Memory system 622 may be any combination of one or more memory devices, volatile, and/or non-volatile memory. A portion of memory system is used to run operating system 628 in which HTTP client 630 executes. Input system 624 may be any combination of input devices, such as one or more keyboards, mice, trackballs, scanners, cameras, and/or interfaces to networks. Output system 626 may be any combination of output devices, such as one or more monitors, printers, and/or interfaces to networks. HTTP client 630 allows users 25-27 of users systems 602 to access, process and view information, pages and applications available to it from server system 600 over network 16. Examples of HTTP client 630 include various browsing applications, such as Microsoft's Internet Explorer browser, Netscape's Navigator browser, Opera's browser, or a WAP-enabled browser in the case of a cell phone, PDA or other wireless device, or the like. Access is gained to requisite tenant information 38 and 40 by entering the URL (not shown) into the URL box 632 of HTTP client 630. The URL directs users 25-27 to the appropriate virtual portal for to determine authorization and permission level to access the requisite tenant information.

Data corresponding with each user 25-27 may be separate from the data corresponding to the remaining users 25-27 regardless of the tenant associated with users 25-27; however, some data might be shared or accessible by a plurality of users 25-27 or all of users 25-27 associated with a tenant. Thus, there might be some data structures managed by server system 600 that are allocated at the tenant level while other data structures might be managed at the user level. Because an MTS typically support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, server system 600 might also maintain system level data usable by multiple tenants or other data. Such system level data might include industry reports, news, postings, and the like that are sharable among tenants.

According to one embodiment, server system 600 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant on line or offline backups or other redundancies, etc., and might include a distributed database or storage network and associated processing intelligence.

Figure 9:
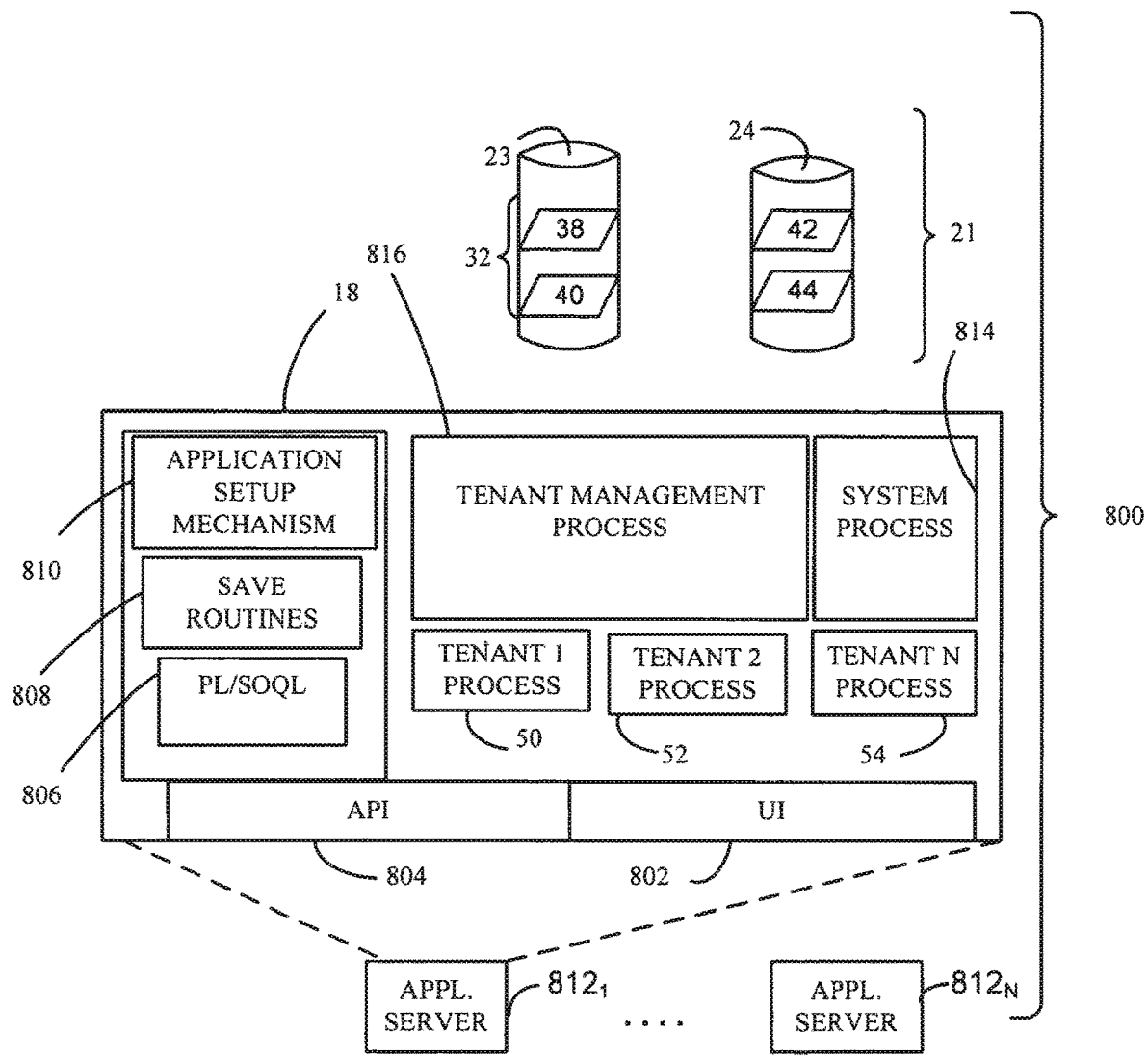
FIG. 9 illustrates a block diagram of an embodiment of elements of FIG. 7 and various possible interconnections between these elements.

Referring to FIG. 9, a specific embodiment of a server system 800 includes database 32, as discussed above, as well as processor sub-system 18 and a network interface 122. In addition, server system 800 includes a user interface (UI) 802, application program interface (API) 804, PL/SOQL 806, save routines 808, an application setup mechanism 810, applications servers 812$_1$-812$_N$, system process space 814, tenant processes 50, 52 and 54, tenant management processes 816. User interface (UI) 802, application program interface (API) 804, PL/SOQL 806, save routines 808, an application setup mechanism 810, tenant processes 50, 52 and 54, tenant management processes 816 are shown as processes running in processor sub-system 18. However, it should be noted that the computer readable code to implement the processes may be stored on drive storage 31. In other embodiments, server system 800 may not have the same elements as those listed above and/or may have other elements instead of, or in addition to, those listed above. Network interface 122 is implemented as a plurality of HTTP application servers 812$_1$-812$_N$.

Referring to FIGS. 1, 6 and 8, each application server 812$_1$-812$_N$ may be configured to service requests of user systems 602 for access to database 32. In this configuration, tenant information 38 and 40 consists of different information storage areas that may physical differentiation, e.g., different hard disks, and/or a logical separation of the information and may include application metadata 92 for each user or groups of users. For example, a copy of a user's most recently used (MRU) items might be included. Similarly, a copy of MRU items for an entire organization that is a tenant might be stored. UI 802 provides a user interface and API 804 provides an application programmer interface to server system 800 resident processes to users and/or developers at user systems 602. The tenant data and the system data may be stored in various databases, such as one or more Oracle™ databases.

Referring again to FIGS. 1, 6 and 8, it is not necessary that the one or more HTTP application servers 812$_1$-812$_N$ be implemented as the sole network interface between server system 800 and network 16. Rather, other communication techniques might be used in conjunction with HTTP application servers 812$_1$-812$_N$ or in lieu thereof. In some implementations, the interface between server system 800 and network 16 includes load sharing functionality, such as round-robin HTTP request distributors to balance loads and distribute incoming HTTP requests evenly over a plurality of servers. At least as for users 25-27 one of HTTP application servers 812$_1$-812$_N$, each of the plurality of servers has access to the MTS data; however, other alternative configurations may be used instead.

Application platform 606 includes an application setup mechanism 810 that supports application developers' creation and management of applications, which may be saved as metadata by save routines 808 for execution by subscribers as one or more tenant process spaces 84 managed by tenant management process 86, for example. Invocations to such applications may be coded using PL/SOQL 806 that provides a programming language style interface extension to API 804. A detailed description of some PL/SOQL language embodiments is discussed in commonly owned co-pending U.S. patent application Ser. No. 11/859,498 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manage retrieving application metadata for the subscriber making the invocation and executing the metadata as an application in a virtual machine.

Each HTTP application servers 812$_1$-812$_N$ may be communicably coupled to database systems, e.g., database 32, via a different network connection. For example, one HTTP application server 812$_1$ might be coupled via the network 16 (e.g., the Internet), another HTTP application servers 812$_1$-812$_N$ might be coupled via a direct network link, and another one of HTTP application servers 812$_1$-812$_N$ might be coupled by yet a different network connection. Transfer Control Protocol and Internet Protocol (TCP/IP) are typical protocols for communicating between HTTP application servers 812$_1$-812$_N$ and database 32. However, it will be apparent to one skilled in the art that other transport protocols may be used to optimize the system depending on the network interconnect used.

In certain embodiments, each of HTTP application servers 812$_1$-812$_N$ is configured to handle requests for any user associated with any organization that is a tenant. Because it is desirable to be able to add and remove application servers from the server pool at any time for any reason, there is preferably no server affinity for a user and/or organization to a specific one of HTTP application servers 812$_1$-812$_N$. In one embodiment, therefore, an interface system implementing a load balancing function (e.g., an F5 Big-IP load balancer) is communicably coupled between HTTP application servers 812$_1$-812$_N$ and the user systems 602 to distribute requests to HTTP application servers 812$_1$-812$_N$. In one embodiment, the load balancer uses a least connections algorithm to route user requests to HTTP application servers 812$_1$-812$_N$. Other examples of load balancing algorithms, such as round robin and observed response time, also can be used. For example, in certain embodiments, three consecutive requests from the same user 25-27 could hit three different HTTP application servers 812$_1$-812$_N$, and three requests from different user systems 602 could hit a common HTTP application server 812$_1$-812$_N$. In this manner, server system 800 is multi-tenant, wherein server system 800 handles storage of, and access to, different objects, data and applications across disparate users and organizations.

In certain embodiments, user systems 602 (which may be client systems) communicate with HTTP application servers 812$_1$-812$_N$ to request and update system-level and tenant-level data from server system 800 that may require sending one or more queries to database 32. Server system 800 (e.g., an application server 812 in server system 800) automatically generates one or more SQL statements (e.g., one or more SQL queries) that are designed to access the desired information. Database may generate query plans to access the requested data from the database.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. For example, the present processes may be embodied as a computer program product that includes a machine-readable storage medium (media) having instructions stored thereon/in which can be used to program a computer to perform any of the processes of the embodiments described herein.

Computer code for operating and configuring the server system to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.). Therefore, the scope of the appended claims should be accorded the broadest interpretation so as to encompass all such modifications and similar arrangements.

What is claimed is:

1. A method for asynchronous batch processing in an on demand computing architecture, having at least a processor and a memory therein to execute instructions for the asynchronous batch processing, wherein the method comprises:
receiving from a plurality of users a plurality of online transaction processing requests;
receiving a batch processing request from a user to manipulate a plurality of data objects;
executing by the processor a plurality of online transaction processes responsive to receiving the plurality of online transaction processing requests;
scheduling a batch process in which the processor is to asynchronously manipulate the data objects with respect to the processor executing the plurality of online transaction processes, responsive to receiving the batch processing request;
executing by the processor the batch process, as scheduled, to asynchronously manipulate the data objects; and
sending, via a service bus, after executing the batch process, one of: a first message that the asynchronous manipulation of the data objects by the batch process is complete, and a second message regarding changes to the data objects as a result of execution of the batch process as scheduled.

2. The method of claim 1, wherein the scheduling of the batch process and the executing of the batch process as scheduled to asynchronously manipulate the data objects comprises invoking:
a start method that identifies the data objects to be asynchronously manipulated by the batch process;
an execute method that schedules and executes the asynchronous manipulation of the identified data objects by the batch process; and
wherein sending, via the service bus, after executing the batch process, one of: a first message that the asynchronous manipulation of the data objects by the batch process is complete, and a second message regarding changes to the data objects as a result of execution of the batch process as scheduled, comprises invoking:
a finish method that, after the start and execute methods have completed, sends one of: a first message that the asynchronous manipulation of the identified data objects by the batch process is complete, and a second message regarding changes to the identified data objects as a result of execution of the batch process as scheduled.

3. The method of claim 2, wherein the start method that identifies the data objects to be asynchronously manipulated by the batch process further selects a maximum number of the identified data objects, the asynchronous manipulation of which is to be scheduled for uninterrupted execution by the batch process; and
wherein the execute method that schedules and executes the asynchronous manipulation of the identified data objects, schedules and executes without interruption the asynchronous manipulation of the maximum number of the identified data objects by the batch process.

4. The method of claim 3, wherein the start method that selects the maximum number of data objects, the asynchronous manipulation of which is to be scheduled for uninterrupted execution by the batch process, further identifies separate transaction groups of the maximum number of the identified data objects, the asynchronous manipulation of each separate transaction group to be scheduled for uninterrupted execution by the batch process; and
wherein the execute method that schedules and executes without interruption the asynchronous manipulation of the maximum number of the identified data objects by the batch process, executes without interruption the asynchronous manipulation of each of the separate transaction groups of the maximum number of the identified data objects by the batch process.

5. The method of claim 4, wherein the scheduling of the batch process and the executing of the batch process, as scheduled, to asynchronously manipulate the data objects comprises separately invoking the execute method to asynchronously manipulate each of the separate transaction groups of the maximum number of the identified data objects by the batch process.

6. The method of claim 5, further comprising:
posting into a first message queue the batch processing request in response to receiving the batch processing request to asynchronously manipulate the data objects;
retrieving the batch processing request from the first message queue;
posting into a second message queue a respective sequence number for each of the separate transaction groups of the maximum number of the identified data objects, responsive to retrieving the batch processing request from the first message queue;
wherein invoking the start method that selects the separate transaction groups of the maximum number of the identified data objects, comprises invoking the start method that selects the separate transaction groups of the maximum number of the identified data objects based on the posted respective sequence numbers in the second message queue; and
wherein separately invoking the execute method to asynchronously manipulate each of the separate transaction groups of the maximum number of the identified data objects comprises:
retrieving from the second message queue each respective sequence number for each of the separate transaction groups of the maximum number of the identified data objects; and,
invoking the execute method to asynchronously manipulate a respective one of the separate transactions for the maximum number of the identified data objects, as identified by the retrieved respective sequence number.

7. Non-transitory computer readable media having instructions stored thereon that, when executed by a processor, cause an application executing in an on-demand computing architecture to perform operations comprising:
receiving from a plurality of users a plurality of online transaction processing requests;
receiving a batch processing request from a user to manipulate a plurality of data objects;
executing by the processor a plurality of online transaction processes responsive to receiving the plurality of online transaction processing requests;
scheduling a batch process in which the processor is to asynchronously manipulate the data objects with respect to the processor executing the plurality of online transaction processes, responsive to receiving the batch processing request;
executing by the processor the batch process, as scheduled, to asynchronously manipulate the data objects; and
sending, via a service bus, after executing the batch process, one of: a first message that the asynchronous manipulation of the data objects by the batch process is complete, and a second message regarding changes to the data objects as a result of execution of the batch process as scheduled.

8. The computer readable media of claim 7, wherein the instructions that cause the scheduling of the batch process and the executing of the batch process as scheduled to asynchronously manipulate the data objects comprises invoking:
a start method that identifies the data objects to be asynchronously manipulated by the batch process;
an execute method that schedules and executes the asynchronous manipulation of the identified data objects by the batch process; and wherein sending, via the service bus, after executing the batch process, one of: a first message that the asynchronous manipulation of the data objects by the batch process is complete, and a second message regarding changes to the data objects as a result of execution of the batch process as scheduled, comprises invoking:
a finish method that, after the start and execute methods have completed, sends one of: a first message that the asynchronous manipulation of the identified data objects by the batch process is complete, and a second message regarding changes to the identified data objects as a result of execution of the batch process as scheduled.

9. The computer readable media of claim 8, wherein the start method that identifies the data objects to be asynchronously manipulated by the batch process further selects a maximum number of the identified data objects, the asynchronous manipulation of which is to be scheduled for uninterrupted execution by the batch process; and
wherein the execute method that schedules and executes the asynchronous manipulation of the identified data objects, schedules and executes without interruption the asynchronous manipulation of the maximum number of the identified data objects by the batch process.

10. The computer readable media of claim 9, wherein the start method that selects the maximum number of data objects, the asynchronous manipulation of which is to be scheduled for uninterrupted execution by the batch process, further identifies separate transaction groups of the maximum number of the identified data objects, the asynchronous manipulation of each separate transaction group to be scheduled for uninterrupted execution by the batch process; and
wherein the execute method that schedules and executes without interruption the asynchronous manipulation of the maximum number of the identified data objects by the batch process, executes without interruption the asynchronous manipulation of each of the separate transaction groups of the maximum number of the identified data objects by the batch process.

11. The computer readable media of claim 10, wherein the instructions that cause the scheduling of the batch process and the executing of the batch process, as scheduled, to asynchronously manipulate the data objects comprises separately invoking the execute method to asynchronously manipulate each of the separate transaction groups of the maximum number of the identified data objects by the batch process.

12. The computer readable media of claim 11, further comprising instructions that cause the application executing in the on-demand computing architecture to perform operations comprising:
posting into a first message queue the batch processing request in response to receiving the batch processing request to asynchronously manipulate the data objects;
retrieving the batch processing request from the first message queue;
posting into a second message queue a respective sequence number for each of the separate transaction groups of the maximum number of the identified data objects, responsive to retrieving the batch processing request from the first message queue;
wherein invoking the start method that selects the separate transaction groups of the maximum number of the identified data objects, comprises invoking the start method that selects the separate transaction groups of the maximum number of the identified data objects based on the posted respective sequence numbers in the second message queue; and wherein separately invoking the execute method to asynchronously manipulate each of the separate transaction groups of the maximum number of the identified data objects comprises:

retrieving from the second message queue each respective sequence number for each of the separate transaction groups of the maximum number of the identified data objects; and, invoking the execute method to asynchronously manipulate a respective one of the separate transactions for the maximum number of the identified data objects, as identified by the retrieved respective sequence number.

13. A system to execute within an on-demand computing architecture, wherein the system comprises:

a processor and a memory to execute instructions at the system;

software instructions that, when executed by the processor, cause an application executing in the on-demand computing architecture to:

receive from a plurality of users a plurality of online transaction processing requests;

receive a batch processing request from a user to manipulate a plurality of data objects;

execute by the processor a plurality of online transaction processes responsive to receiving the plurality of online transaction processing requests;

schedule a batch process in which the processor is to asynchronously manipulate the data objects with respect to the processor executing the plurality of online transaction processes, responsive to receiving the batch processing request;

execute by the processor the batch process, as scheduled, to asynchronously manipulate the data objects; and send, via a service bus, after executing the batch process, one of: a first message that the asynchronous manipulation of the data objects by the batch process is complete, and a second message regarding changes to the data objects as a result of execution of the batch process as scheduled.

14. The system of claim 13, wherein the software instructions that cause the application to schedule the batch process and execute the batch process as scheduled to asynchronously manipulate the data objects comprises invoking:

a start method that identifies the data objects to be asynchronously manipulated by the batch process;

an execute method that schedules and executes the asynchronous manipulation of the identified data objects by the batch process; and wherein to send, via the service bus, after executing the batch process, one of: a first message that the asynchronous manipulation of the data objects by the batch process is complete, and a second message regarding changes to the data objects as a result of execution of the batch process as scheduled, comprises invoking:

a finish method that, after the start and execute methods have completed, sends one of: a first message that the asynchronous manipulation of the identified data objects by the batch process is complete, and a second message regarding changes to the identified data objects as a result of execution of the batch process as scheduled.

15. The system of claim 14, wherein the start method that identifies the data objects to be asynchronously manipulated by the batch process further selects a maximum number of the identified data objects, the asynchronous manipulation of which is to be scheduled for uninterrupted execution by the batch process; and wherein the execute method that schedules and executes the asynchronous manipulation of the identified data objects, schedules and executes without interruption the asynchronous manipulation of the maximum number of the identified data objects by the batch process.

16. The system of claim 15, wherein the start method that selects the maximum number of data objects, the asynchronous manipulation of which is to be scheduled for uninterrupted execution by the batch process, further identifies separate transaction groups of the maximum number of the identified data objects, the asynchronous manipulation of each separate transaction group to be scheduled for uninterrupted execution by the batch process; and wherein the execute method that schedules and executes without interruption the asynchronous manipulation of the maximum number of the identified data objects by the batch process, executes without interruption the asynchronous manipulation of each of the separate transaction groups of the maximum number of the identified data objects by the batch process.

17. The system of claim 16, wherein the instructions that cause the application to schedule the batch process and execute of the batch process, as scheduled, to asynchronously manipulate the data objects comprises separately invoking the execute method to asynchronously manipulate each of the separate transaction groups of the maximum number of the identified data objects by the batch process.

18. The system of claim 17, further comprising software instructions that, when executed by the processor, cause the application executing in the on-demand computing architecture to:

post into a first message queue the batch processing request in response to receiving the batch processing request to asynchronously manipulate the data objects;

retrieve the batch processing request from the first message queue;

post into a second message queue a respective sequence number for each of the separate transaction groups of the maximum number of the identified data objects, responsive to retrieving the batch processing request from the first message queue;

wherein invoking the start method that selects the separate transaction groups of the maximum number of the identified data objects, comprises invoking the start method that selects the separate transaction groups of the maximum number of the identified data objects based on the posted respective sequence numbers in the second message queue; and wherein separately invoking the execute method to asynchronously manipulate each of the separate transaction groups of the maximum number of the identified data objects comprises the system to:

retrieve from the second message queue each respective sequence number for each of the separate transaction groups of the maximum number of the identified data objects; and, invoke the execute method to asynchronously manipulate a respective one of the separate transactions for the maximum number of the identified data objects, as identified by the retrieved respective sequence number.

\* \* \* \* \*